United States Patent [19]
Colosimo

[11] 3,738,088
[45] June 12, 1973

[54] MOBILE AIR CLEANING APPARATUS FOR POLLUTION REMOVAL

[76] Inventor: Louis E. Colosimo, 23231 Port, St. Clair Shores, Mich. 48082

[22] Filed: June 4, 1971

[21] Appl. No.: 150,083

[52] U.S. Cl. ................... 55/104, 23/288 R, 55/118, 55/126, 55/129, 55/138, 55/139, 55/242, 55/274, 55/320, 55/356, 55/385, 55/418, 55/467, 55/482, 55/DIG. 19, 55/DIG. 28, 55/DIG. 41

[51] Int. Cl. ............................................. B03c 3/66

[58] Field of Search .................. 55/104, 118, 120, 55/126, 129, 138, 139, 242, 274, 320, 356, 385, 418, 467, 482, DIG. 19, DIG. 28, DIG. 41; 23/288 R; 98/2.01, 2.05, 2.06, 2.11; 73/421 R, 421 A, 421.5 R; 123/119 R, 119 B, 119 E, 41.86

[56] References Cited
UNITED STATES PATENTS

| | | | |
|---|---|---|---|
| 2,881,854 | 4/1959 | Vehre, Jr. | 55/316 |
| 2,990,911 | 7/1961 | Lippincott | 55/104 |
| 3,157,479 | 11/1964 | Boles | 55/154 X |
| 3,299,620 | 1/1967 | Hollingworth | 55/126 |
| 3,406,669 | 10/1968 | Edwards | 123/119 B |

FOREIGN PATENTS OR APPLICATIONS 717,705  11/1954  Great Britain ............. 55/102

*Primary Examiner*—Dennis E. Talbert, Jr.
*Attorney*—Harness, Dickey & Pierce

[57] ABSTRACT

In a driven vehicle an air filtering assembly for cleaning pollution from the ambient air in the path of the vehicle by utilizing the vehicle and assembly as a mobile cleaning device.

10 Claims, 7 Drawing Figures

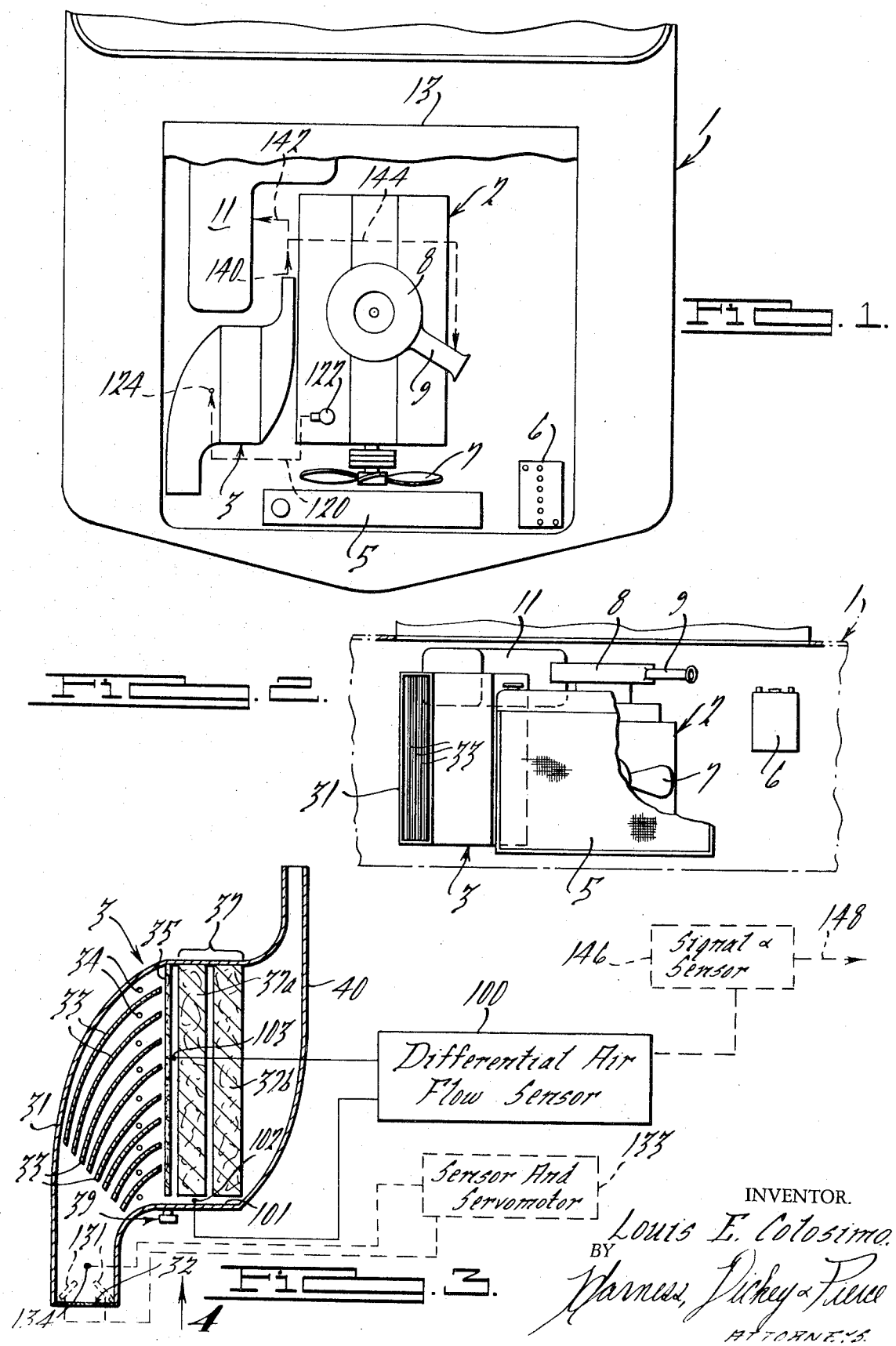

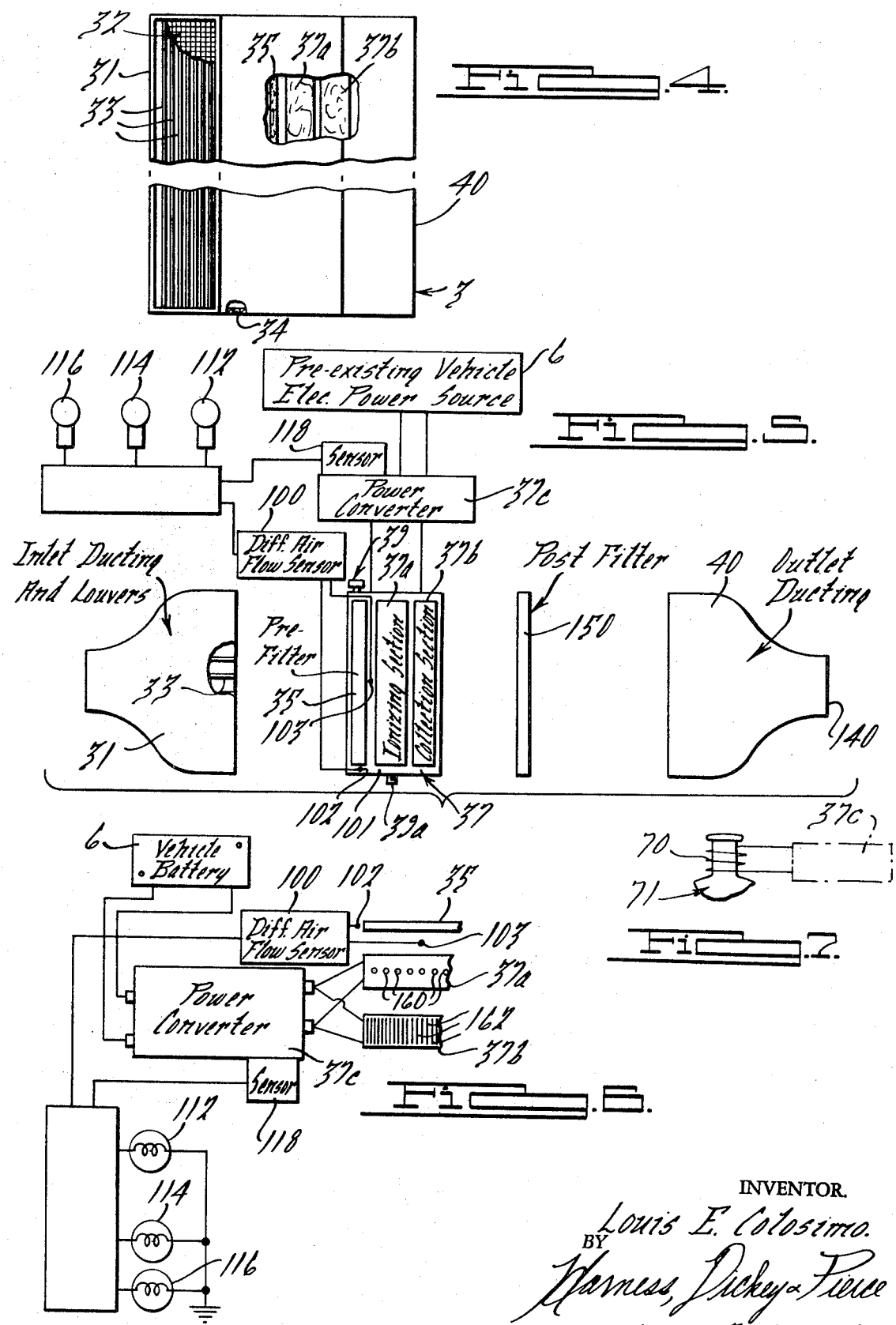

MOBILE AIR CLEANING APPARATUS FOR POLLUTION REMOVAL

BACKGROUND OF THE INVENTION

The state of the prior art references, which are cited here of record, is indicated by the following references which were located in a preliminary examination: Hornig U. S. Pat. No. 3,534,530; Jacobs U. S. Pat. No. 3,070,971; and, "Manual of Electrostatic Precipitator Technology" by S. Oglesby et al., published August 1970.

This invention relates to an air filtering assembly in a driven vehicle capable of utilization such that ambient air in the path of the vehicle is cleaned to remove pollution from the air.

A primary object of this invention is to provide a new technique of cleaning pollution from the air which involves the provision of a novel air filtering assembly in a driven vehicle such that the assembly is coordinated and cooperates with the vehicle to clean pollution from the air by utilizing the vehicle-assembly as a mobile cleaning device.

Another object of this invention is to provide a new air filtering assembly in a vehicle driven by an internal combustion engine.

Another object of the present invention is to provide a new vehicle-air filtering assembly combination which cleans pollution from the air by utilizing the combination as a mobile cleaning device to clean the air which is in the path of the moving vehicle.

Another object of the invention is to provide a ducting means in the air filtering assembly referred to herein such that ambient air in the path of the vehicle which is cleaned passes through the filtering assembly within efficient operational limits of the filtering assembly.

Another object of the present invention is to provide in the air filtering assembly referred to a construction whereby damage to more delicate parts of the filtering assembly is prevented, such as that damage which might occur from stones, water, and heavy particulate material passing into the filtering assembly at an inappropriate time during the usage of the assembly.

Another object of the invention is to provide a new air filtering assembly in a driven vehicle, which filtering assembly is separate from the normal air filter mounted above the carburetor of an internal combustion engine for a vehicle, and which air filtering assembly is electrically energized by a battery or alternator operatively connected with the vehicle.

Another object of the invention is to provide a new air filtering assembly in a driven vehicle which may optionally include a post filter which is a catalytic, replaceable cartridge type filter for the purpose of cleaning the air of nonparticulate or aerosol pollution (hereinafter referred to as nonparticulate pollution) such as carbon monoxide, unburned hydrocarbons, nitrous oxides, and/or sulphur oxides, and the like.

Another object of the invention is to provide an air filtering assembly in a driven vehicle wherein ducting means may be utilized to direct the cleaned air from the outlet of the filtering assembly to desired uses such as the fresh air or air conditioning system of the vehicle (i.e., the fresh air, heating, or cooling system of the vehicle).

Another object of the present invention is to provide an air filtering assembly in a driven vehicle which acts as a mobile cleaning device to clean the air of pollution added by other vehicles and also of pollution contributed to the air by industry, nature (pollen, bacteria, etc.) and humans (such as insecticides, dust, etc.).

Another object of the present invention is to provide an air filtering assembly in a driven vehicle which assembly includes a catalytic post filter which may by providing an offsetting effect eliminate the need for a catalytic filter in the exhaust system of the vehicle.

Another object of the present invention is to provide a new air filtering assembly in a driven vehicle wherein an electronic precipitator filtering means is utilized in a unique manner to thereby enable the filtering assembly to clean pollution from ambient air in the path of the vehicle.

Another object of the present invention is to provide a new air filtering assembly in a driven vehicle which includes means for spraying a fluid into the filtering assembly for periodic cleaning and rejuvenating thereof intermittent to its actual usage as a mobile cleaning device.

Other objects, features and advantages of the present invention will become apparent from the subsequent description and from the appended claims taken in conjunction with the accompanying drawings, wherein like numerals in different figures indicate like elements.

BRIEF DESCRIPTION OF THE DRAWINGS

FIG. 1 illustrates a top plan view of the under-the-hood compartment for an internal combustion engine with the air filtering assembly of this invention mounted therein;

FIG. 2 illustrates a front view of FIG. 1;

FIG. 3 illustrates a top view of the air filtering assembly in cross section;

FIG. 4 illustrates a front view of FIG. 3 in partially cut away form;

FIG. 5 illustrates in schematic form the air filtering assembly;

FIG. 6 illustrates in schematic form the electrical system used in the invention; and, FIG. 7 illustrates another embodiment of the invention wherein a power source for the air filtering assembly is derived from the alternator of the vehicle.

SUMMARY OF THE INVENTION

The present invention involves, in a vehicle driven by an internal combustion engine, an air filtering assembly means for cleaning air taken into the assembly at a controlled rate relative to movement of the vehicle and said assembly being operative to discharge cleaned air therefrom, said assembly means comprising: ducting means for controlling the velocity of the inlet air to the assembly in coordination with the velocity of the vehicle and operating limits of the filtering assembly, first filter means for removing relatively larger size particulate material from the inlet air, second electronic precipitator filter means for removing relatively smaller size particulate material from the air, said assembly means being operative to clean pollution from the air by utilizing the vehicle as a mobile cleaning device, and said assembly being powered by pre-existing power source means on the vehicle which supplies a source of electrical energy.

From another aspect the present invention involves, in a driven vehicle, an air filtering assembly means for cleaning air taken into the assembly at a controlled rate relative to movement of the vehicle and said assembly being operative to discharge cleaned air therefrom, said assembly means comprising: ducting means for properly introducing and distributing inlet air to the assembly, filter means for removing relatively larger size particulate material from the inlet air, and for removing relatively smaller size particulate material from the air, and said assembly means being operative to clean pollution from the ambient air in the path of the vehicle by utilizing the vehicle as a mobile cleaning device.

DESCRIPTION OF THE PREFERRED EMBODIMENTS

FIGS. 1-4 illustrate a vehicle 1, engine 2 and air filtering assembly means 3 in accordance with the invention. The engine 2, typically shown in an automobile vehicle 1, is of the internal combustion type having a fan 7, conventional air filter 8 for intake into the carburetor, and an air intake 9 to the air filter 8. The engine 2 has a cooling system operatively connected with a radiator 5 and has an electrical system operatively connected with a battery 6. The battery 6, of course, can be charged by appropriate circuitry including an alternator adapted to be driven by the engine 2.

FIG. 3 shows the important portions of the air filtering assembly 3 in a top cross-sectional view. The assembly 3 is comprised of ducting means 31 which may be specially tuned and designed to channel or control the input of air to the filtering assembly 3 such that a controlled velocity of air is introduced to the assembly, in an evenly distributed fashion across the cross sectional area of the filter means as discussed hereinafter, to optimize the filtering ability of the assembly 3. After the air passes into ducting means 31 it comes into contact with distributing louvres or vanes 33 which evenly direct the inlet air into a first filter means or prefilter designated 35. The vanes 33 may be suitably designed to evenly distribute air to the prefilter 35 and the electronic filter 37. The vanes 33 may be streamlined turning vanes or the like. The ducting means 31 and the louvres or vanes 33 may also be designed to keep the noise level down and to keep the velocity of air within the operating limits of the filtering assembly; and, furthermore the duct work and vanes help to protect the filters from water and damaging particulate material such as stones. A screen 32 (FIGS. 3 and 4), for example of ⅜ inch mesh size, may suitably be positioned across the entrance to the duct 31 to prevent leaves and other large particulates from entering duct 31.

Holes or apertures 34 are positioned at the bottom of the duct work 31 just before the louvres or vanes 33 such that water runoff may be allowed to pass out the bottom of the duct work 31 before the inlet air reaches the prefilter 35.

The outlet duct work means 40 is to direct the cleaned air from the air filtering assembly either back to the atmosphere or it may be directed to other desirable uses such as in the fresh air, or air conditioning system (for heating and cooling purposes) of the vehicle. This latter purpose is of course highly advantageous in that it allows persons inside the vehicle to breathe cleaned air, and for example this would be particularly advantageous to persons with allergies. The outlet duct means 40 may also be used to assist in accomplishing proper velocity control of the throughput of air through the air filtering assembly.

It should also be understood that the ducting means 31 may be designed in a manner such that the air filtering assembly 3 will operate at an optimized efficiency preferably of about 95 percent and no less than 75 percent at a particular vehicle speed, e.g., approximately 60 m.p.h. The design of the tuned ducting means may be such that within the speed range of approximately 30-90 m.p.h. the air filtering assembly will operate at an efficiency of no less than about 50 percent and preferably the efficiency of the air filtering assembly will remain at 75 percent or higher at the speed range 30-90 m.p.h. Furthermore it should be understood that tuning of the ducting means and velocity control of the air throughput can be carried out in any satisfactory manner dependent upon the vehicle involved and the type of usage for which the vehicle is particularly adapted.

The ducting means 31 may also include special flow reducing means 131 (FIG. 3) at the entrance thereto, with the flow reducing means being formed by suitable structural means such as hinged panels which are openable and closeable to reduce the inlet air flow to the ducting means 31. The flow reducing means 131 are controlled by sensor and servomotor means 133 which react to a signal from the air flow sensing at point 134.

The prefilter 35 is designed primarily to remove relatively larger sized particulate material from the inlet air. For example the prefilter is designed to remove particulate material within the range of about 1 micron up to about 100 microns and higher. The prefilter 35 is also designed such that it is sufficiently strong to resist damage by large particulate material such as stones, etc., and the prefilter may also be used to help prevent drops of water from passing through to the second filter means.

After the air passes through the prefilter 35 it next passes into the electronic precipitator filter means designated 37 which is comprised of two different sections, namely an ionizing section 37a and a collecting plates section designated 37b. The electronic precipitating means operates to cleanse the air of particulate material ranging in a size generally from about 0.01 microns up to about 1 micron and higher.

The electronic precipitator filtering means 37 also includes a power pack 37c for converting the pre-existing electrical power source within the vehicle, such as the voltage available at battery 6, to the electrical voltage required by the ionizing section 37a and collecting plates section 37b of the precipitator filter means 37. Alternatively the pre-existing electrical power source on the vehicle 1 which is utilized to power the filtering assembly may be a special voltage winding 70 (FIG. 7) on the alternator 71 of the vehicle, which alternator is of the conventional type normally used to charge the vehicle battery. The winding 70 is special constructed to provide an output voltage having a magnitude which is readily adapted for usage by the power converter 37c.

Airborne particles of dust, dirt, smoke, pollen and germs which are carried through the duct work and the prefilter 35 into the electronic precipitator filter 37 are passed through a high energy electrical field set up between ionizing wires 160 in the ionizing section 37a and the particles receive a positive electrical charge. The particulate material is subjected to a predetermined optimized residence time within the ionizing section 37a which may be specially constructed so that it possesses a preselected length dimension in the direction of travel of the particulate material through ionizing section 37a and thus the ionizing section is operative to provide sufficient residence time for charging of the particulate material relative to the velocity at which the material passes through the ionizing section. For example, the filtering assembly 3 may be optionally designed for producing cleansed air in an amount of approximately 500 cubic feet per minute at a vehicle speed of about 60 m.p.h., and the construction of the ionizing section 37a may be designed accordingly. When the charged particles reach the collecting plates section 37b, the particles encounter a second electrical field set up between a series of plates 162, such as aluminum plates, which are alternately charged positively and negatively. The positively charged particle as it passes between two plates is repelled by the positive plate and is attracted by the negative plate where it is held until washed off. Where advantageous the field in the ionizing section 37a may be selected to provide a negative charge to the particles in which case the particles would be collected on the positive plate. The ionizing wires 160 may be made for example of tungsten, for long life, and the wires may be spiraled to provide more positive ionization and performance, and yet can easily be replaced if necessary. The collecting plates 162 may be high grade aluminum spaced in accordance with conservative design parameters to provide a rugged and stable operation and extra dirt holding capacity. The structural members of the filtering means 37 may satisfactorily be constructed of aluminum or stainless steel to combine strength and durability with lightweight.

Velocity throughput of air through the air filtering assembly is measured by a suitable air flow sensing means 100. The air flow sensing means may suitably be of the type which senses the differential between the unrestricted straight through flow of air which bypasses the filtering assembly through the small channel 101 at the point 102 relative to the air flow measured at a point 103 on the downstream side of the prefilter 35.

As shown in FIGS. 5 and 6, the air flow sensing means 100 and sensor means 118 may also be used to signal and activate one or more warning lights designated 112, 114, and 116. Warning light 112 may be located at the rear of the vehicle for external policing as to whether the filtering assembly 3 is properly functioning. Warning light 114 may, for example, be mounted on the instrument panel or dash panel of the vehicle to indicate malfunctioning or improper functioning of the filtering assembly 3. Warning light 116 may be used (mounted either on the electronic precipitator or on the vehicle instrument panel) to indicate that the electronic precipitator is drawing excessive voltage as sensed by the sensor means 118 thus indicating that the electronic precipitator 37 requires cleaning.

Cleaning of either filter means 35 or filter means 37 may be carried out, for example, by connecting a sprayable fluid source to the connection means 39 (FIG. 5) through the use of a hose or the like, and spraying the fluid over the interior of the filter means to clean or rejuvenate same. In order that the effluent from the cleaning operation does not again escape into the environment the effluent may be collected from the bottom of the filtering assembly 3, for example, through the utilization of a collector nozzle means 39a. Alternatively, cleaning of the filter means 35 and/or 37 may satisfactorily be carried out by removing same from the assembly 3 and washing same.

Another alternative use of the filtering assembly 3 in accordance with the invention is to connect a vent line designated 120 to act as a breather from the oil cap 122 such that all of the fumes from the oil sump of the vehicle are vented through the conduit 120 for introduction into the filtering assembly 3 at a point designated 124 such that the fumes transmitted through the conduit 120 can be cleaned by passage through the filtering assembly. Alternatively the same embodiment of breather line 120 being used to introduce fumes 124 in the filtering assembly 3 may be applied to vent the fumes from the vehicle gas tank through the filtering assembly 3.

The cleaned air from the filtering assembly 3 may be discharged at 140 into the environment such that the environment is enriched by the operation of the filtering assembly 3 in cleaning the ambient air in the path of the vehicle 1 as described above. Alternatively the cleaned air from the filtering assembly 3 may be introduced into the fresh air/heating/cooling system 11 of the vehicle adjacent the firewall 13 through a conduit designated 142. In another alternative embodiment of this invention the cleaned air which is discharged from the filtering assembly 3 may in a fractional amount be introduced into the air inlet 9 for the carburetor of the vehicle through the conduit designated 144, and in effect this system can be utilized to take advantage of the cubic displacement of the vehicle engine for drawing air through the filtering assembly. In the event that the air flow sensing means 100 signals that the air flow passage through the filter means 35, 37 is becoming restricted then the sensor and servomotor means 146 can be used to signal through 148 the opening of a vent door (not shown) at the end of the air intake 9 to admit normal atmospheric air to the air filter 8 above the carburetor of the vehicle 1.

As shown in the schematic view of FIG. 5 a catalytic postfilter means may suitably be placed in the filtering assembly of this invention downstream from the filter means 35, 37. The catalytic filter designated 150 may suitably be of the replaceable cartridge type which is operative to clean the air which comes in contact therewith of nonparticulate pollution such as carbon monoxide, unburned hydrocarbons, nitrous oxides, sulphur oxides, and the like. The postfilter 150 may also be of a type suitable for assisting in controlling the velocity of air passing through the filter means 35, 37 and also the postfilter 150 may be used to collect blow through from the collector plates 162 of the electronic filter 37.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims. It should be understood that while the description herein has been made primarily with respect to a vehicle driven by an internal combustion engine that usage of the invention is contemplated in relation to other types of vehicles.

What is claimed is:

1. In a vehicle driven by an internal combustion engine, an air filtering assembly means for cleaning air taken into the assembly at a controlled rate relative to movement of the vehicle and said assembly being operative to discharge cleaned air therefrom,
said assembly means comprising:
ducting means which are tuned for controlling the velocity of the inlet air to the assembly in coordination with the velocity of the vehicle and operating limits of the filtering assembly,
first filter means for removing relatively larger size particulate material from the inlet air,
second electronic precipitator filter means for removing relatively smaller size particulate material from the air,
said assembly means being operative to clean pollution from the air by utilizing the vehicle as a mobile cleaning device, and
said assembly being powered by pre-existing power source means on the vehicle which provides electrical energy for the engine, and wherein,
said assembly includes
air flow sensing means for determining clogging in said filter means and whether flow of air through said filter means is maintained at a proper level.

2. The invention of claim 1 wherein,
said assembly includes
electrical power source means on the vehicle for supplying electricity to the assembly and
power converter means for converting the power source to usable voltage range for powering the filter means.

3. The invention of claim 1 wherein,
said ducting means are tuned to be operative in maintaining efficiency of said filter means at a level of at least 75 percent efficiency at a vehicle speed of 60 m.p.h. and at a level not lower than 50 percent efficiency over a vehicle speed range from 30 to 90 m.p.h.

4. The invention of claim 1 wherein,
said ducting means includes
air flow reducing means operative to control the amount of inlet air introduced into said assembly means within efficient operating limits.

5. The invention of claim 1 with said pre-existing power source comprising a voltage generator driven by the engine to provide electrical power for operation of the engine and including a separate winding adapted to provide electrical power for said electronic precipitator filter means.

6. The invention of claim 1 wherein,
said assembly includes
differential air flow sensing means for determining clogging in said filter means and whether flow of air through said first filter means is maintained at a proper level, and
signal means for alerting that the filtering assembly means is not performing properly.

7. The invention of claim 6 wherein,
said signal means include an activatable warning means on an instrument panel of the vehicle.

8. The invention of claim 6 wherein,
said signal means include a light signal policing means externally mounted on the vehicle for policing whether said filtering assembly is performing properly.

9. The invention of claim 6 with said power source comprising a voltage generator driven by the engine to provide electrical power for operation of the engine and including a separate winding adapted to provide the required electrical power to said power converter means.

10. In a vehicle driven by an internal combustion engine, an air filtering assembly means for cleaning air taken into the assembly at a controlled rate relative to movement of the vehicle and said assembly being operative to discharge cleaned air therefrom,
said assembly means comprising:
ducting means which are tuned for controlling the velocity of the inlet air to the assembly in coordination with the velocity of the vehicle and operating limits of the filtering assembly,
first filter means for removing relatively larger size particulate material from the inlet air,
second electronic precipitator filter means for removing relatively smaller size particulate material from the air,
said assembly means being operative to clean pollution from the air by utilizing the vehicle as a mobile cleaning device, and
said assembly being powered by pre-existing power source means on the vehicle which provides electrical energy for the engine, and wherein,
said assembly includes
sensing means for determining voltage drop in the electronic precipitator filter means and for indicating that said filter means is becoming overloaded and requires cleaning.

* * * * *